May 21, 1968
P. C. O'LEARY
3,384,187
CABLE FEED FOR ROCK DRILLS
Filed Feb. 25, 1966
2 Sheets-Sheet 1
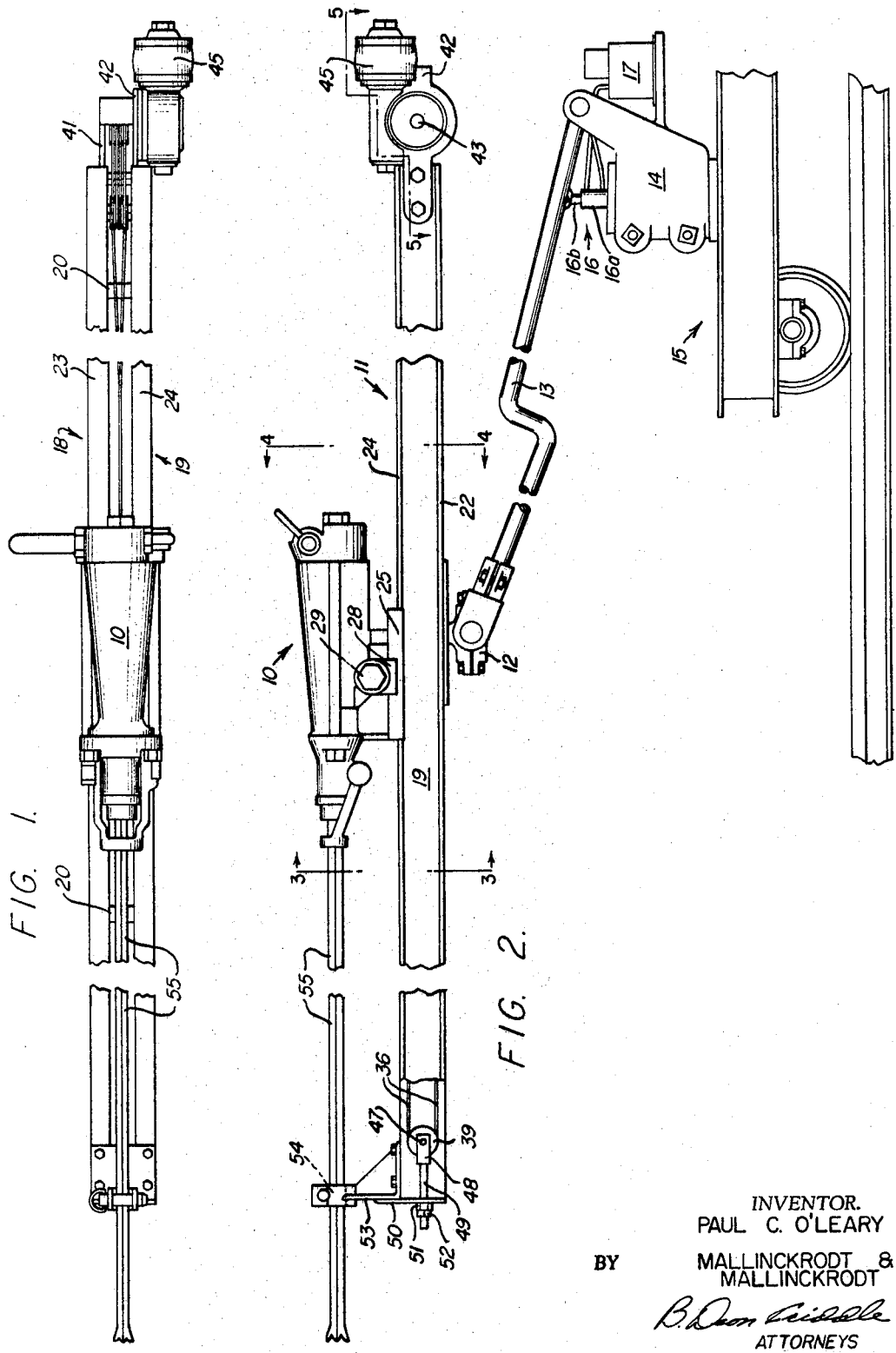
INVENTOR.
PAUL C. O'LEARY
BY MALLINCKRODT & MALLINCKRODT
ATTORNEYS

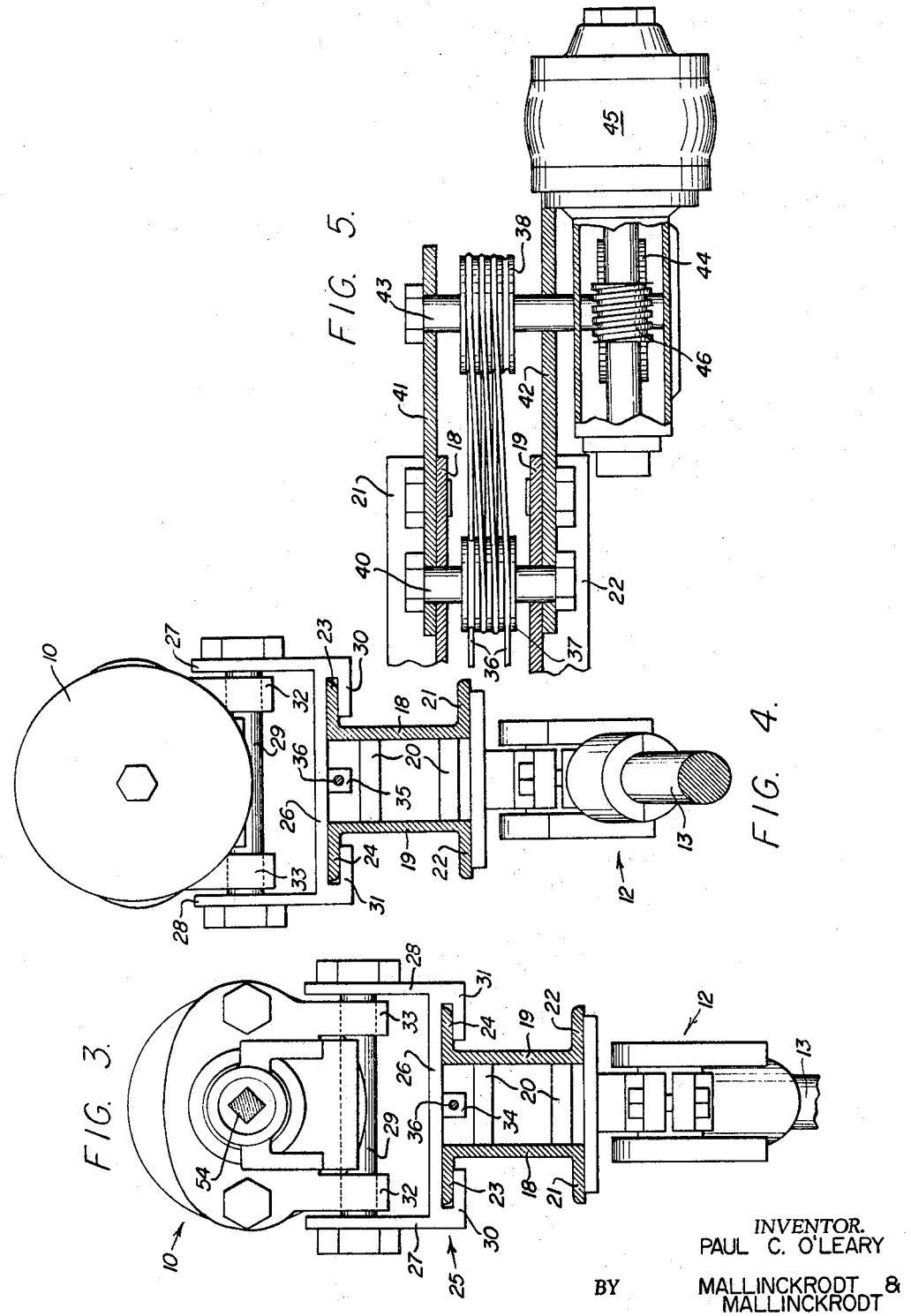

United States Patent Office

3,384,187
Patented May 21, 1968

3,384,187
CABLE FEED FOR ROCK DRILLS
Paul C. O'Leary, Salt Lake City, Utah, assignor to Machinery Center, Inc., Salt Lake City, Utah, a corporation of Utah
Filed Feb. 25, 1966, Ser. No. 530,019
6 Claims. (Cl. 173—147)

ABSTRACT OF THE DISCLOSURE

A cable-operated support for advancing and retracting a rock drill relative to work underway. A length of cable is fastened to a rock drill mount so as to form a closed loop that extends along a guide rail on which the rock drill mount is arranged to travel. The cable is supported adjacent to opposite ends of the guide rail for movement within and along a path defined by the loop formation. A friction wheel is arranged in engagement with the cable and preferably at one end of the loop to drive the cable loop back and forth, thereby moving the rock drill mount back and forth along the rail. Drive means for rotating the friction wheel advantageously includes reversible motive means.

---

This invention relates to rock drills such as are commonly used in underground mining operations, and is particularly concerned with the drive mechanisms used to feed and retract such drills during drilling operations.

Modern rock drills are usually so heavy and unwieldy that supporting guide structure and powered feed and retraction means are required to aid in their manipulation. In the past this guiding, feeding, and retracting has been accomplished in a number of different ways. For example, fluid or mechanical-screw powered, telescoping, support legs have been used, or in some instances the drills have been mounted on guide tracks or rails and separate pneumatic cylinders or mechanical screws have been used to reciprocate them. While such guiding and reciprocating means generally accomplish their desired objectives of properly positioning a drill bit, of driving the bit to penetrate the rock being drilled, and of withdrawing the bit from the rock, they are usually expensive to construct and require frequent costly repairs. Also, they are unduly heavy and therefore difficult to move from one drilling location to another.

Principal objects in the making of the present invention were to provide a driving means for reciprocating a rock drill, which driving means would be inexpensive to construct and maintain, light in weight, and capable of absorbing shocks resulting from impact of the drill bit during use, thus greatly reducing the frequency with which the more expensive drill components are damaged and providing an inexpensive but sturdy guide means for the drill.

These objects were accomplished by providing a simple guide rail for the drill made of spaced, back-to-back, channel members, and by using a cable wrapped around a pair of friction wheels as the drive transmission means between a motor and the drill.

There is shown in the accompanying drawings a specific embodiment of the invention representing what is presently regarded as the best mode of carrying out the generic concepts in actual practice. From the detailed description of this presently preferred form of the invention, other more specific objects and features will become apparent.

In the drawings:

FIG. 1 represents a top plan view of a rock drill mounted, in accordance with the invention, on a guide rail;

FIG. 2, a side elevation, showing how the guide rail is connected to a mobile support;

FIG. 3, an enlarged vertical section taken on the line 3—3 of FIG. 2;

FIG. 4, a similar view taken on the line 4—4 of FIG. 2; and

FIG. 5, an enlarged, fragmentary, horizontal section taken on the line 5—5 of FIG. 2, and showing the drive assembly between the motor and the cable connected to the drill.

Referring now to the drawings:

In the illustrated preferred embodiment, a rock drill 10 is mounted on a composite guide rail shown generally at 11.

Through a mounting assembly 12, composite guide rail 11 is adapted to be supported for both pivotal and rotating movement on the end of a boom 13 that has its other end pivotally connected to a swivel mount 14 on a mobile support, which is shown fragmentarily at 15. The mobile support can be a mine car, a crawler type tractor, or any other desired movable support apparatus, but is here shown as a rail car.

A hydraulic cylinder 16 has its housing 16a resting on the swivel mount 14 and its rod 16b pivotally connected to the underside of the boom such that expulsion of the rod will raise the boom and retraction of the rod will lower the boom. A valve 17 controls supply and exhaust of pressure fluid to and from hydraulic cylinder 16. The boom and the hydraulic cylinder are manually rotatable about the vertical axis formed by the swivel connection between mount 14 and mobile support 15, to allow the composite guide rail and the drill carried thereby to be positioned for drilling operations.

The composite guide rail 11 is constructed from a pair of back-to-back channel members 18 and 19 that are held in parallel relationship by spacers 20. The mounting assembly 12 is fixed to bottom flange surfaces 21 and 22 of the channel members making up the composite guide rail, intermediate its length, and the drill is guided by top flanges 23 and 24.

Rock drill mounting means in the form of a special elongate guide mount 25 is employed to hold the drill on the composite guide rail. The guide mount includes a flat plate 26 adapted to rest on top flanges 23 and 24, upstanding ears 27 and 28, through which a pin 29 is passed, and inturned flanges 30 and 31 beneath the plate 26 and adapted to respectively slide along the bottoms of the flanges 23 and 24 of the guide rail and to hold the mount thereon.

Pin 29 also passes through ears 32 and 33 that are fixed to the drill 10 and holds the drill securely on the mount.

A pair of anchor brackets 34, FIG. 3, and 35, FIG. 4, depend from plate 26, one at each end. These anchor brackets are adapted to clear the spacers 20 as the drill 10 and special mount are moved along the composite guide rail.

A cable 36 has one end clamped or otherwise affixed to the anchor bracket 34 and its other end clamped or otherwise affixed to anchor bracket 35 to form a closed loop extending along the guide rail. Intermediate its length the cable is wrapped several times around a pair of friction wheels 37 and 38, that are positioned between channel members 18 and 19 at the rear end of the composite guide rail, and passes around a pulley 39 mounted between the channel members at the forward end of the composite guide rail.

Friction wheel 37 is mounted on a shaft 40 that is journaled through the channel members 18 and 19 and through extension plates 41 and 42, so that the wheel is freely rotatable. Such extension plates are rigidly bolted to the respective channel members. Wheel 37 is, thus, freely rotatable. Friction wheel 38 is similarly fixed on a shaft 43 that is journaled through the extension plates 41 and 42, but shaft 43 then extends through channel member 42 and has a drive gear 44 fixed thereon. Both friction wheels are preferably, but not necessarily, grooved around their periphery to prevent binding of the cable.

Extension plate 42 also supports a reversible motor 45, the output shaft of which has a worm gear 46 fixed thereto. The worm gear is arranged to mesh with the drive gear 44 to thereby rotate shaft 43 and the friction wheel 38.

Pulley 39 is journaled for rotation about a pin 47 passing through a clevis 48 that is mounted on the end of a threaded rod 49. Rod 49 is passed through an end plate 50 at the forward end of the composite guide rail and is secured by lock nuts 50 and 51. Tension in cable 36 is adjusted by threading the lock nuts onto and off of the rod.

A guide plate 53, having a hole 54 through an upright portion thereof, is bolted on top of flanges 23 and 24 and is welded or otherwise affixed to the end plate 50.

The bit 55 of the drill 10 is passed through hole 54 and is thus held in desired guided alignment during operation of the drill.

In operation, motor 45 is started so as to drive the worm gear 46 such that it turns drive gear 44 and the friction wheel 38 in one direction, i.e. counterclockwise as viewed in FIG. 2, to take in the lower reach of cable 36 while paying out the upper reach, whereby the cable is moved along the path defined by the loop. This moves the drill out, away from the friction wheels. If it is desired to move the drill in toward the friction wheels, it is only necessary to reverse the operation of motor 45. The upper reach of cable 36 will then be pulled in, while the lower reach will be payed out, whereby the cable is again moved along the path defined by the loop, but in the opposite direction.

With the disclosed arrangement, there is provided a lightweight feed assembly for a rock drill that is simple and inexpensive to construct. The feed assembly is easily maintained, since the component most subject to wear, i.e. the cable, is readily available anywhere, and it is not subject to the impact damage frequently associated with rock drill feed assemblies, since the cable has sufficient resiliency to absorb much of the shock that results when the bit encounters a solid surface.

Whereas there is here illustrated and specifically described a certain preferred construction of apparatus which is presently regarded as the best mode of carrying out the invention, it should be understood that various changes can be made and other constructions adopted without departing from the inventive subject matter particularly pointed out and claimed herebelow.

I claim:

1. A cable-operated support for advancing and retracting drill, comprising
    a guide rail;
    rock drill mounting means mounted on said guide rail for reciprocation therealong;
    a length of cable secured to said mounting means in the form of a closed loop extending along said rail;
    means adjacent to opposite ends of said rail supporting said cable for movement; and
    drive means for moving said cable within and along the path defined by said loop, said drive means including a friction wheel with which the cable is engaged, and means for driving said friction wheel.

2. A cable-operated support for advancing and retracting a rock drill as recited in claim 1, wherein the means for driving the friction wheel comprises an axle for the friction wheel; a drive gear fixed to said axle; a reversible motor; and a worm gear fixed to the drive shaft of the motor and in meshing engagement with the drive gear.

3. A cable-operated support for advancing and retracting a rock drill as recited in claim 1, wherein the means for driving the friction wheel includes a reversible motor for driving the friction wheel in opposite directions.

4. A cable-operated support for advancing and retracting a rock drill as recited in claim 3, wherein the means supporting the cable includes an additional friction wheel around which the cable is wrapped.

5. A cable-operated support for advancing and retracting a rock drill as recited in claim 4, wherein the friction wheel included in the drive means for the cable is disposed at one end of the cable loop and serves also as a cable support; and wherein the friction wheel included in the cable supporting means is located within the loop and has the cable wrapped therearound.

6. A cable-operated support for advancing and retracting a rock drill as recited in claim 5, wherein the cable supporting means also includes a pulley at the opposite end of the cable loop.

References Cited

UNITED STATES PATENTS

| | | | |
|---|---|---|---|
| 2,088,649 | 8/1937 | Hart | 173—147 X |
| 2,094,124 | 9/1937 | Huffman | 173—147 X |
| 2,103,252 | 12/1937 | Gartin | 173—147 X |
| 2,639,895 | 5/1953 | Gallo | 173—147 X |
| 2,730,332 | 1/1956 | Hale | 173—147 |
| 2,869,826 | 1/1959 | Thornburg | 173—147 |

FOREIGN PATENTS 1,348,561   12/1963   France.

DAVID H. BROWN, *Primary Examiner.*

UNITED STATES PATENT OFFICE
CERTIFICATE OF CORRECTION

Patent No. 3,384,187                      May 21, 1968

Paul C. O'Leary

It is certified that error appears in the above identified patent and that said Letters Patent are hereby corrected as shown below:

Column 3, line 51, before "drill" insert -- a rock --.

Signed and sealed this 7th day of October 1969.

(SEAL)
Attest:

Edward M. Fletcher, Jr.                WILLIAM E. SCHUYLER, JR.
Attesting Officer                       Commissioner of Patents